(12) United States Patent
Nam et al.

(10) Patent No.: US 11,161,259 B2
(45) Date of Patent: Nov. 2, 2021

(54) ACTUATOR MODULE HAVING FLEXIBLE SECTION

(71) Applicant: ROBOTIS CO., LTD., Seoul (KR)

(72) Inventors: Hyoungchul Nam, Seoul (KR);
Byoung Soo Kim, Seoul (KR);
Ungkwon Yun, Seoul (KR)

(73) Assignee: ROBOTIS CO., LTD., Seoul (KR)

( * ) Notice: Subject to any disclaimer, the term of this patent is extended or adjusted under 35 U.S.C. 154(b) by 428 days.

(21) Appl. No.: 16/311,943

(22) PCT Filed: Feb. 23, 2018

(86) PCT No.: PCT/KR2018/002279
§ 371 (c)(1),
(2) Date: Dec. 20, 2018

(87) PCT Pub. No.: WO2019/164037
PCT Pub. Date: Aug. 29, 2019

(65) Prior Publication Data
US 2021/0046659 A1 Feb. 18, 2021

(51) Int. Cl.
*B25J 19/06* (2006.01)
*B25J 9/12* (2006.01)
*B25J 19/00* (2006.01)
*B25J 9/08* (2006.01)

(52) U.S. Cl.
CPC ............ *B25J 19/068* (2013.01); *B25J 9/126* (2013.01); *B25J 19/0004* (2013.01); *B25J 19/0091* (2013.01); *B25J 9/08* (2013.01)

(58) Field of Classification Search
CPC .... B25J 9/126; B25J 17/0233; B25J 19/0004; B25J 19/0091; B25J 19/068; F16D 3/78; F16D 3/79; F16D 3/10; F16D 2200/0078; F16F 15/1213
USPC ..................................... 267/162; 464/98, 99
See application file for complete search history.

(56) References Cited

U.S. PATENT DOCUMENTS 2,499,093 A * 2/1950 Webb .................... F16D 3/78
464/94
4,795,012 A * 1/1989 Durum .................. F16D 3/52
192/207
9,833,662 B2 * 12/2017 Potter ................. A63B 21/153
(Continued)

FOREIGN PATENT DOCUMENTS

KR 10-1309652 B1 9/2013

*Primary Examiner* — Joseph Brown
(74) *Attorney, Agent, or Firm* — Novick, Kim & Lee, PLLC; Jae Youn Kim; Jihun Kim

(57) ABSTRACT

An actuator module includes a drive unit for generating a rotational force, a deceleration unit connected to the drive unit to receive the rotational force therefrom for reducing a rotational speed transmitted thereto to increase the rotational force, a flexible unit connected to the deceleration unit to receive the rotational force therefrom and having a plurality of elastic members in a stacked form, the elastic members being variable by an external force, and an output unit connected to the flexible unit to receive the rotational force therefrom for outputting the transmitted rotational force to the outside, wherein the elastic members have the same elastic force or different elastic forces, and are selectively varied depending on the magnitude of the external force applied to the output unit.

6 Claims, 6 Drawing Sheets

(56) References Cited

U.S. PATENT DOCUMENTS

| | | | |
|---|---|---|---|
| 2011/0067517 A1* | 3/2011 | Ihrke | B25J 9/126 74/490.03 |
| 2012/0312114 A1* | 12/2012 | Deegan | F16H 57/12 74/409 |
| 2015/0272809 A1* | 10/2015 | Accoto | A61H 1/0237 623/31 |
| 2016/0131216 A1* | 5/2016 | Miyazaki | F16F 1/14 73/862.321 |
| 2019/0061168 A1* | 2/2019 | Wang | B25J 13/085 |
| 2019/0160658 A1* | 5/2019 | Hutter | B25J 9/126 |
| 2019/0299421 A1* | 10/2019 | Kim | F16F 1/028 |
| 2021/0013773 A1* | 1/2021 | Lee | B25J 9/00 |

* cited by examiner

ACTUATOR MODULE HAVING FLEXIBLE SECTION

TECHNICAL FIELD

The present invention relates to an actuator module with a flexible unit, and more particularly, to an actuator module mounted on an articulated robot and having a flexible unit capable of detecting an abnormal load through sensor-based accurate load measurement to improve essential stability of the actuator module.

BACKGROUND ART

An actuator module commonly has a built-in drive unit and decelerator, and is widely used for household and educational purposes as wells as for general industrial purposes. In particular, such an actuator module has been further spotlighted in recent years in that it can realize an articulated robot capable of performing a complex operation when a large number of actuator modules are coupled to the articulated robot.

An articulated robot may be realized by repeatedly coupling a plurality of standardized actuator modules and the connection members thereof. In this case, the articulated robot may be moved by a teaching movement method in which a user instructs and memorizes the operation of the robot to reproduce it or by an autonomous movement method in which the robot operates by self-determination.

However, in the case of the articulated robot moving by the teaching movement method, there is a problem in that it is impossible to detect when the articulated robot collides with any object or person and it is difficult to secure stability through active response.

In order to resolve such a problem, an actuator module for detecting a collision with any object or person through a torque sensor has been developed (Korean Patent No. 10-1309652).

However, this actuator module is problematic in that it is difficult to secure essential stability since the actuator module may merely detect a collision and may not absorb an impact applied thereto or to a colliding object at the time of collision. In addition, the resolution of the torque sensor is a very important factor in the actuator module. However, the torque sensor having a high resolution is problematic in that it is very expensive and increases the manufacturing cost of the actuator module.

Accordingly, there is a demand for development of an actuator module capable of absorbing an impact applied to an object at the time of collision and having an improved torque resolution.

SUMMARY OF INVENTION

Technical Problem

It is an object of the present invention to provide an actuator module capable of measuring an accurate load through a sensor-based flexible unit while absorbing an impact applied to an object at the time of collision, and having an improved torque resolution.

The present invention is not limited to the above-mentioned object, and other objects of the present invention can be clearly understood by those skilled in the art to which the present invention pertains from the following description.

Solution to Problem

To accomplish the above object, in accordance with an aspect of the present invention, there is provided an actuator module that includes a drive unit for generating a rotational force, a deceleration unit connected to the drive unit to receive the rotational force therefrom for reducing a rotational speed transmitted thereto to increase the rotational force, a flexible unit connected to the deceleration unit to receive the rotational force therefrom and having a plurality of elastic members in a stacked form, the elastic members being variable by an external force, and an output unit connected to the flexible unit to receive the rotational force therefrom for outputting the transmitted rotational force to the outside, wherein the elastic members have the same elastic force or different elastic forces, and are selectively varied depending on the magnitude of the external force applied to the output unit.

In the aspect of the present invention, the elastic members may have first insertion grooves of different sizes, respectively, and be stacked such that the first insertion grooves are positioned close to the deceleration unit in the order that they are large, and the output unit may have a first protrusion formed on one surface thereof so that the first protrusion is inserted into the first insertion grooves.

In the aspect of the present invention, the elastic members may have second insertion grooves of the same size, respectively, and the deceleration unit may have a second protrusion formed on one surface thereof so that the second protrusion is inserted into the second insertion grooves.

In the aspect of the present invention, the elastic member may include a first body having a hollow defined at its center and having one or more first insertion grooves formed at positions away from the hollow by a predetermined distance, a second body having a hollow defined at its center, the hollow having a diameter greater than that of the first body, and having one or more second insertion grooves formed along the circumference thereof, and a plurality of connectors connecting an outer peripheral surface of the first body and an inner peripheral surface of the second body, and each bent in a zigzag form, the connectors being variable by an external force.

In the aspect of the present invention, the actuator module may further include encoders disposed between the deceleration unit and the flexible unit and between the flexible unit and the output unit, respectively, for measuring a displacement of the flexible unit according to its deformation.

In the aspect of the present invention, the drive unit, the deceleration unit, the flexible unit, and the output unit may be vertically coupled to each other through a hollow shaft.

Advantageous Effects of Invention

In accordance with an embodiment of the present invention, it is possible to measure a small displacement by a low-resolution encoder. That is, a low-resolution encoder that is relatively inexpensive can realize the same torque resolution as a high-resolution encoder, which can reduce the manufacturing cost of an actuator module.

In accordance with an embodiment of the present invention, the actuator module and a colliding object may not be damaged by absorption of impact when they collide with any object.

The present invention is not limited to the above effects, and it should be understood that the present invention includes all effects which can be inferred from the following detailed description of the present invention or the configuration of the invention defined by the appended claims.

DESCRIPTION OF EMBODIMENTS

Figure 1:
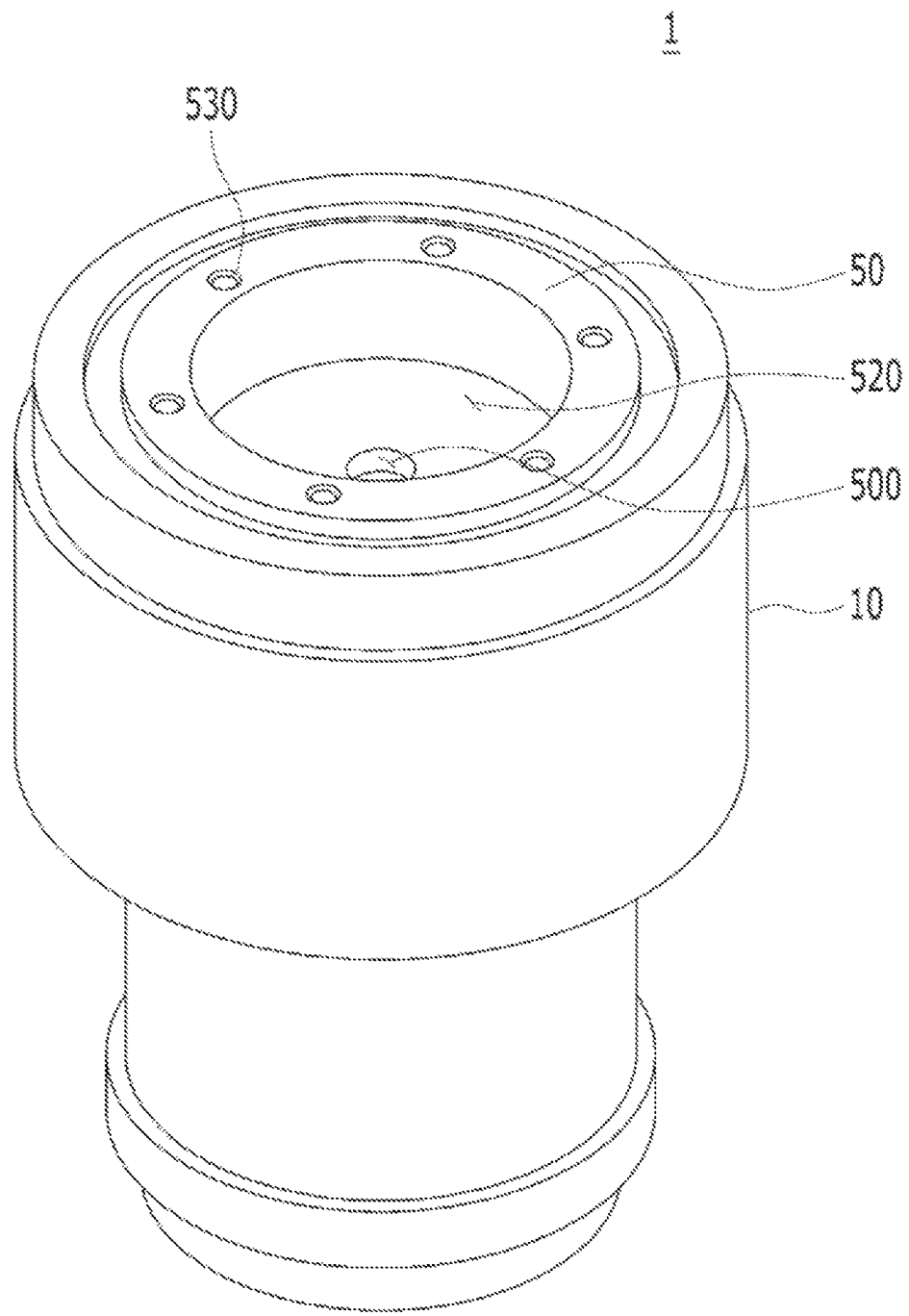
FIG. 1 is a perspective view illustrating an actuator module according to an embodiment of the present invention.

Reference will now be made in detail to exemplary embodiments of the present invention, examples of which are illustrated in the accompanying drawings. The present invention may, however, be embodied in different forms and should not be construed as limited to the embodiments set forth herein. For clear explanation of the present invention, parts irrelevant to the description may be omitted in the drawings, and like reference numerals refer to like parts throughout the specification.

In the whole specification, it will be understood that when an element is referred to as being "connected (joined, contacted, or coupled)" to another element, it can be "directly connected" to the other element or it can be "indirectly connected" to the other element with other elements being interposed therebetween. In addition, it will be understood that when a component is referred to as "comprising or including" any component, it does not exclude other components, but can further comprise or include the other components unless otherwise specified.

The terminology used in the present disclosure is for the purpose of describing particular embodiments only and is not intended to limit the invention. As used in the disclosure and the appended claims, the singular forms "a", "an" and "the" are intended to include the plural forms as well, unless context clearly indicates otherwise. It will be further understood that the terms "comprises/includes" and/or "comprising/including" when used in this specification, specify the presence of stated features, integers, steps, operations, elements, components, and/or groups thereof, but do not preclude the presence or addition of one or more other features, integers, steps, operations, elements, components, and/or groups thereof.

Hereinafter, exemplary embodiments of the present invention will be described in detail with reference to the accompanying drawings.

Figure 2:
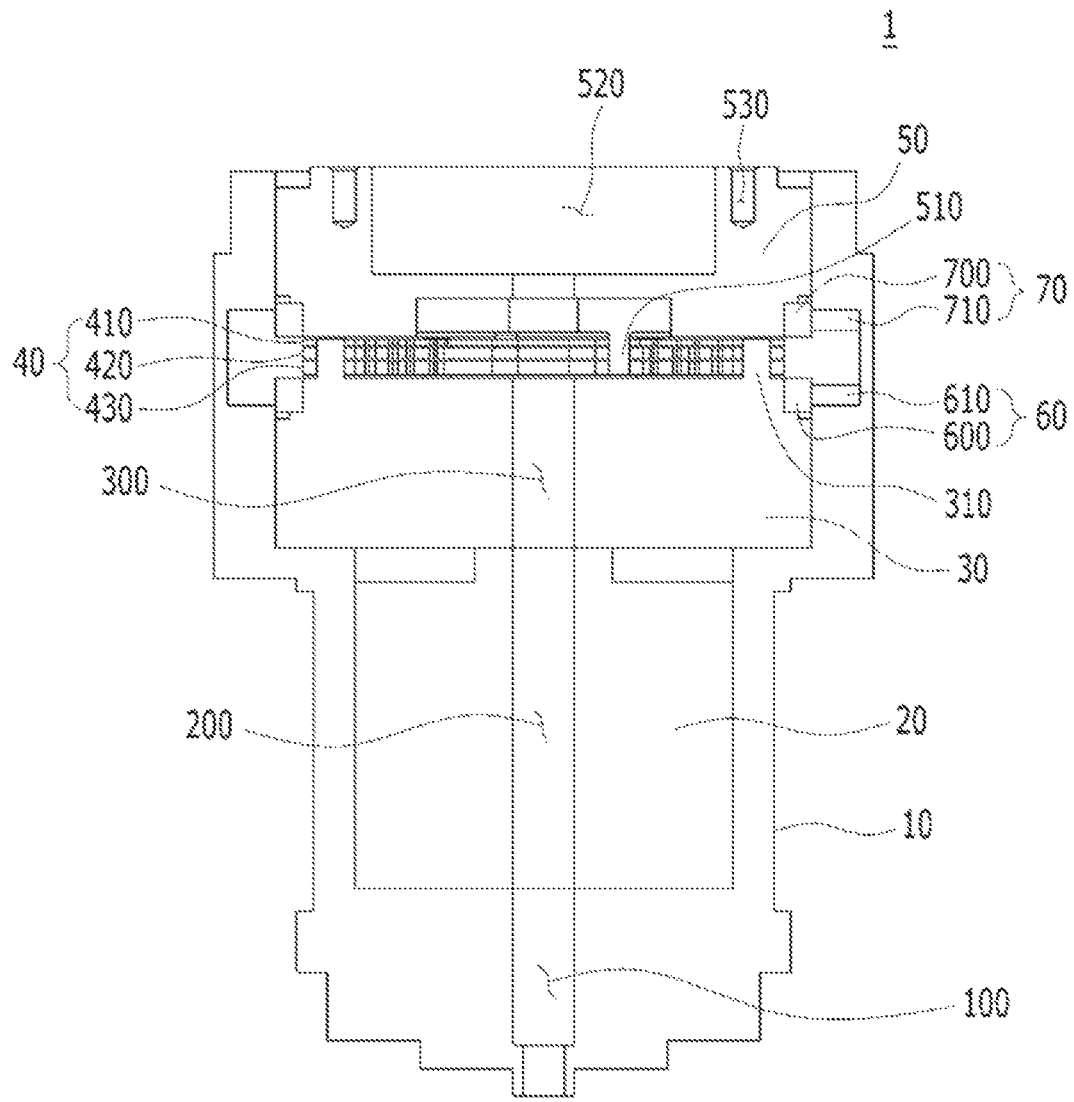
FIG. 2 is a cross-sectional view illustrating the actuator module according to the embodiment of the present invention.
Figure 3:
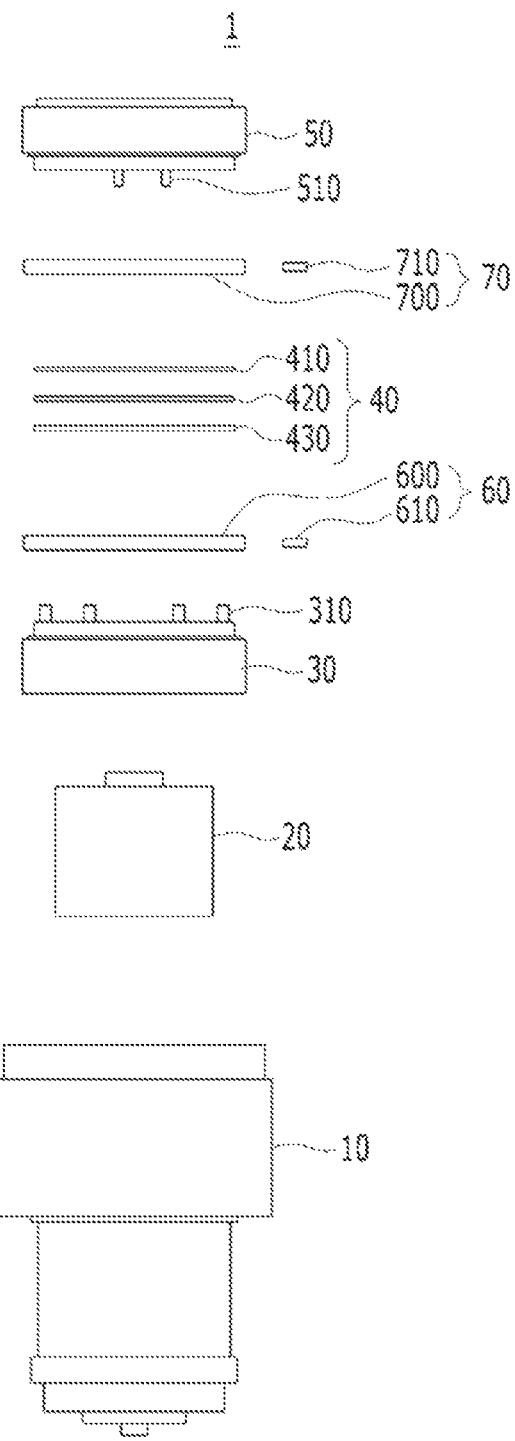
FIG. 3 is an exploded view illustrating the actuator module according to the embodiment of the present invention.

FIG. 1 is a perspective view illustrating an actuator module 1 according to an embodiment of the present invention. FIG. 2 is a cross-sectional view illustrating the actuator module 1 according to the embodiment of the present invention. FIG. 3 is an exploded view illustrating the actuator module 1 according to the embodiment of the present invention.

The actuator module 1 may include a drive unit 20, a deceleration unit 30, a flexible unit 40, and an output unit 50, and may further include a housing 10 and a plurality of encoders 60 and 70.

The actuator module 1 may have a cylindrical shape as a whole, and have a hollow defined therein for connection of wires such as cables through the hollow. When the wires are connected through the hollow within the actuator module, the wires may not be twisted by rotational movement.

The drive unit 20 is a component that generates a rotational force. The drive unit 20 may have at least one motor (not shown) and transmit the rotational force thereof to the deceleration unit 30 through a gear coupled to the rotary shaft of the motor. The drive unit 20 may have a hollow 200 defined therein, and wires such as cables may be positioned in the hollow 200.

Meanwhile, the above-mentioned motor serves to convert electric energy into mechanical energy. Since the configuration and operation method of the motor are widely known in the art, a description thereof will be omitted herein.

The deceleration unit 30 is a component that receives a rotational force from the drive unit 20 and reduces the rotational speed transmitted thereto to increase the rotational force. The deceleration unit 30 may be disposed on the same axis as and connected to the drive unit 20, and at least one region thereof may rotate along with the rotation of the drive unit 20. The deceleration unit 30 may have a hollow 300 defined at a position corresponding to the hollow 200 of the drive unit 20, and wires such as cables may be positioned in the hollow 300.

The deceleration unit 30 may have a second protrusion 310 formed on one surface adjacent to the flexible unit 40 to transmit the decelerated rotational force to the flexible unit 40. That is, one surface of the deceleration unit 30 may be connected to the flexible unit 40 and the other surface thereof may be connected to the drive unit 20.

Although not illustrated in the drawings of the present invention, the deceleration unit 30 may have a gear (not shown) that engages with the gear coupled to the rotary shaft of the motor to receive the rotational force transmitted from the drive unit 20.

The flexible unit 40 is a component that is varied by an external force. The flexible unit 40 may consist of a plurality of elastic members in a stacked form, and may be disposed on the same axis as and connected to the drive unit 20. In addition, the flexible unit 40 may rotate along with the rotation of the deceleration unit 30, and may be disposed on the same axis as and connected to the output unit 50 to transmit the rotational force thereof to the output unit 50. That is, one surface of the flexible unit 40 may be connected to the deceleration unit 30 and the other surface thereof may be connected to the output unit 50. The flexible unit 40 may have a hollow 400 defined at a position corresponding to the hollow 300 of the deceleration unit 30, and wires such as cables may be positioned in the hollow 400.

Figure 4:
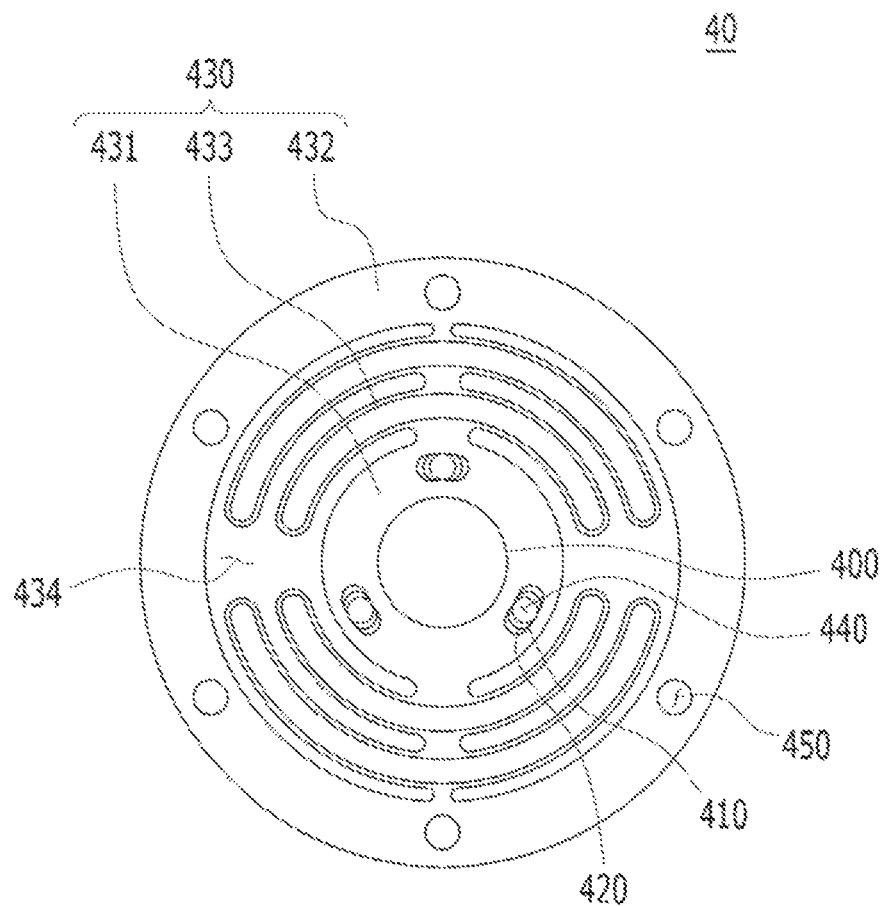
FIG. 4 is a view illustrating a flexible unit of the actuator module according to the embodiment of the present invention.
Figure 5:
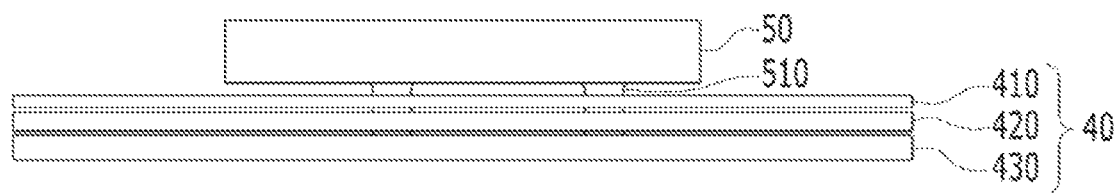
FIGS. 5 and 6 are views illustrating an assembled state of the flexible unit and output unit of the actuator module according to the embodiment of the present invention.
Figure 6:
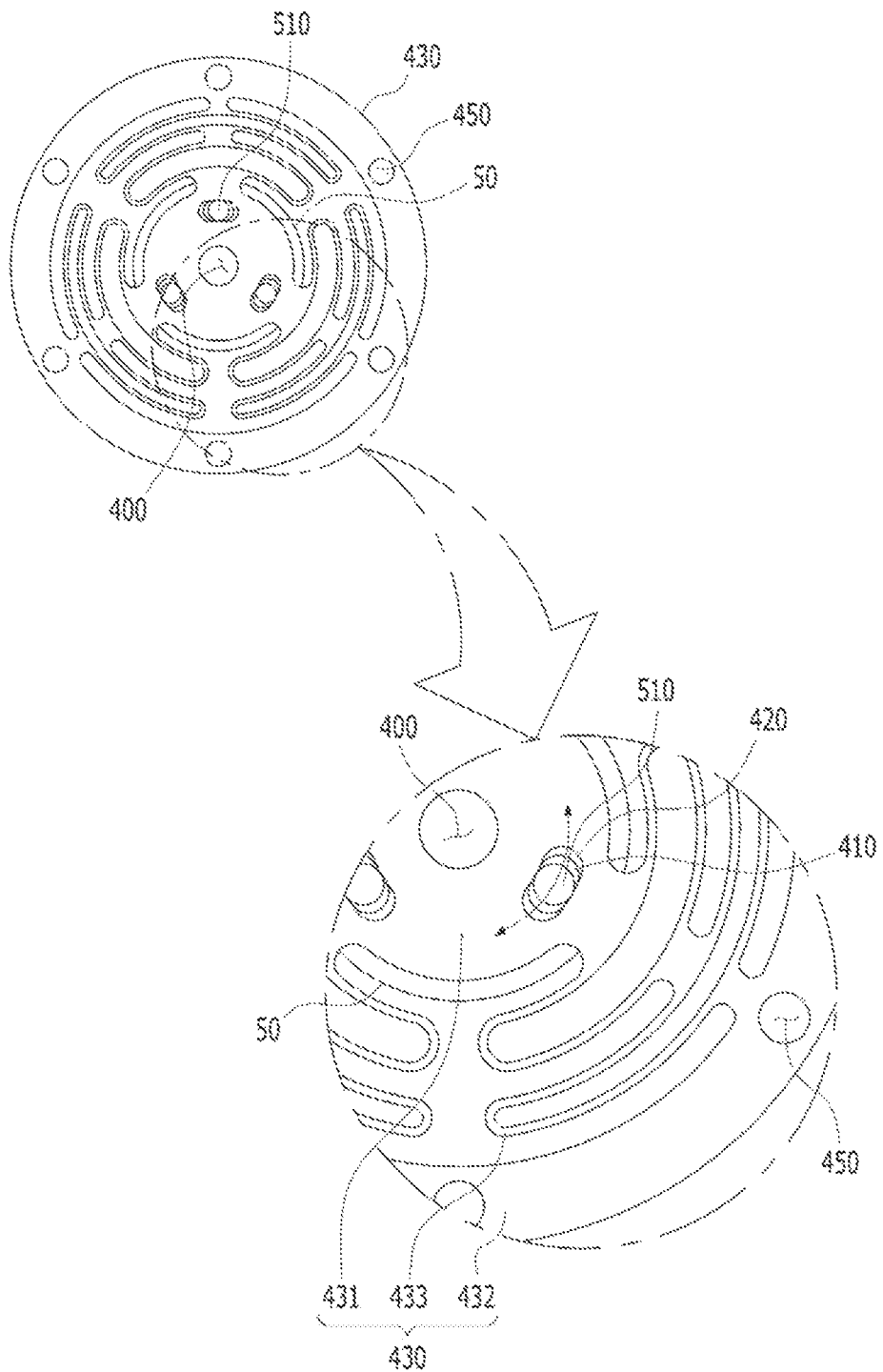

The flexible unit 40 will be described with reference to FIGS. 4 to 6. Although FIGS. 4 to 6 illustrate the flexible unit 40 having three elastic members 410, 420, and 430, the present invention is not limited thereto. In addition, FIGS. 4 and 5 illustrate only a portion of the output unit 50 having a first protrusion 510 formed thereon for the convenience of illustration.

Hereinafter, the elastic members are referred to as a first elastic member 410, a second elastic member 420, and a third elastic member 430 in the order that they are close to the output unit 50.

The first to third elastic members 410 to 430 may be formed to have an elastic force in at least partial region of each thereof, and the elastic region may be deformed when an external force is applied thereto. In this case, the first to third elastic members 410 to 430 may have the same elastic force or different elastic forces. When the first to third elastic members 410 to 430 have different elastic forces, they may be made of materials having different elastic forces, or may be made of the same material to have different thicknesses.

According to the embodiment of the present invention, each of the first to third elastic members 410 to 430 may have a first insertion groove 440 for insertion of the first protrusion 510, and a second insertion groove 450 for insertion of the second protrusion 310. In this case, the first insertion grooves 440 may have different sizes for each elastic member.

In more detail, the first elastic member 410 may have the smallest first insertion groove 440, the second elastic member 420 may have a first insertion groove 440 greater than the first elastic member 410, and the third elastic member 430 has a first insertion groove 440 greater than the first and second elastic members 410 and 420. In other words, the elastic members may be stacked such that the first insertion grooves 440 thereof are positioned close to the output unit 50 in the order that they are small.

Meanwhile, the first protrusion 510 may have the same size as the first insertion groove 440 of the first elastic member 410, and may be positioned at the centers of the first insertion grooves 440 of the second and third elastic members 420 and 430 when an external force is not applied to the output unit 50. In other words, when an external force is not applied to the output unit 50, only the first insertion groove 440 of the first elastic member 410 may come into contact with the first protrusion 510. In this case, the external force applied to the output unit 50 may be a force against the rotation of the output unit 50.

The second insertion grooves 450 may have the same size as each other regardless of the stacking order of the elastic members, and may have the same size as the second protrusion 310.

By such a flexible unit 40, the first elastic member 410 positioned closest to the output unit 50 may be elastically deformed when an external force of first magnitude is applied to the output unit 50, the first and second elastic members 410 and 420 may be elastically deformed when an external force of second magnitude is applied to the output unit 50, and the first to third elastic members 410 to 430 may be elastically deformed when an external force of third magnitude is applied to the output unit 50. In this case, the second magnitude is greater than the first magnitude, and the third magnitude is greater than the second magnitude.

That is, the elastic members 410, 420, and 430 may be selectively varied depending on the magnitude of the external force applied to the output unit 50 so that the present invention can have a wide range of deformation. Consequently, it is possible to improve a torque resolution and obtain a high-resolution effect even by a low-resolution encoder.

Hereinafter, the shapes of the elastic members will be described in more detail. Prior to full explanation, a description will be focused on the third elastic member 430 directly illustrated in FIGS. 4 and 6. However, the first and second elastic members 410 and 420 have a shape similar to the third elastic member 430.

The third elastic member 430 may include a first body 431, a second body 432, and a plurality of connectors 433.

The first body 431 is connected to the output unit 50. The first body 431 may have a hollow 400 defined at the center thereof, and may be a circular plate having one or more first insertion grooves 440 formed at positions away from the hollow 400 by a predetermined distance.

The second body 432 is connected to the deceleration unit 30. The second body 432 may have a hollow 434 formed to have a diameter greater than that of the first body 431, and may be a circular plate having one or more second insertion grooves 450 formed along the circumference thereof. In this case, the second body 432 may be disposed on the same plane as the first body 431.

The connectors 433 connect the first body 431 and the second body 432. Each of the connectors 433 may be bent in a zigzag form and may have an elastic force. That is, the connector 433 may be an elastic body, and its shape may be changed depending on the load applied thereto.

In the plurality of connectors 433, one of them may be connected to at least one other connector adjacent thereto. In addition, the connectors 433 may be made of different materials or have different shapes for each elastic member.

The first and second bodies 431 and 432 may be dislocated and the connectors 433 may be deformed when an external force is applied to the output unit 50, and the first and second bodies 431 and 432 may be returned to their original positions and the connectors 433 may be returned back to their original shapes when the external force applied to the output unit 50 is canceled. That is, the present invention can absorb an impact by deforming the connectors at the time of colliding with any object.

The output unit 50 is a component that outputs the rotational force transmitted thereto to the outside. The output unit 50 may be disposed on the same line as and connected to the flexible unit 40, and at least one region thereof may rotate along with the rotation of the first elastic member 410. In addition, the output unit 50 may have a hollow 500 defined at a position corresponding to the hollow 400 of the flexible unit 40, and wires such as cables may be positioned in the hollow 500.

The first protrusion 510 may be formed on one surface of the output unit 50 adjacent to the flexible unit 40 and may be inserted into the first insertion grooves 440. The output unit 50 may receive a rotational force through the first protrusion 510 from the flexible unit 40 or may transmit the external force applied from an external object to the flexible unit 40.

According to the embodiment of the present invention, the output unit 50 may have a groove 520 formed for coupling with another actuator module, and may have a coupling hole 530 formed around the groove 520 such that a coupling port is inserted into the coupling hole 530 to provide secure coupling with that actuator module.

The housing 10 is a component that accommodates the drive unit 20, the deceleration unit 30, the flexible unit 40, and the output unit 50 therein. The housing 10 may have a hollow 100 defined longitudinally therein, and the drive unit 20, the deceleration unit 30, the flexible unit 40, and the output unit 50 may be accommodated in the hollow 100. In this case, the housing 10 and the drive unit 20 may be coupled to each other by various fastening methods such as screwing.

The two encoders 60 and 70 are components that measure the displacement of the flexible unit 40. One of them is formed between the deceleration unit 30 and the flexible unit 40 and the other is formed between the flexible unit 40 and the output unit 50.

Hereinafter, the encoder formed between the deceleration unit 30 and the flexible unit 40 is referred to as a first encoder 60, and the encoder formed between the flexible unit 40 and the output unit 50 is referred to as a second encoder 70. In this case, each of the first and second encoders 60 and 70 may include a magnet and at least one hall sensor for measuring a magnetic force.

The first encoder may have a concentric magnet 600. The magnet 600 may be coupled to the output side of the deceleration unit 30, namely to the outer peripheral surface of the deceleration unit 30 adjacent to the flexible unit 40, and may rotate along with the rotation of the third elastic member 430. The first encoder may have a hall sensor 610 coupled to the housing 10 so as to correspond to the magnet 600 of the first encoder, and the hall sensor 610 may measure the magnetic force generated in the magnet 600 of the first encoder.

The second encoder may have a concentric magnet 700. The magnet 700 may be coupled to the input side of the output unit 50, namely to the outer peripheral surface of the output unit 50 adjacent to the flexible unit 40, and may rotate along with the rotation of the first elastic member 410. The second encoder may have a hall sensor 710 coupled to the housing 10 so as to correspond to the magnet 700 of the second encoder, and the hall sensor 710 may measure the magnetic force generated in the magnet 700 of the second encoder.

According to the embodiment of the present invention, the positions of the magnets and hall sensors of the first and second encoders 60 and 70 may be changed. In addition, the first and second encoders 60 and 70 may each be a contact encoder or a contactless encoder.

The detected magnetic force may be transmitted to a control unit (not shown), and the control unit may determine a displacement by the magnetic force transmitted thereto.

Figure 7:
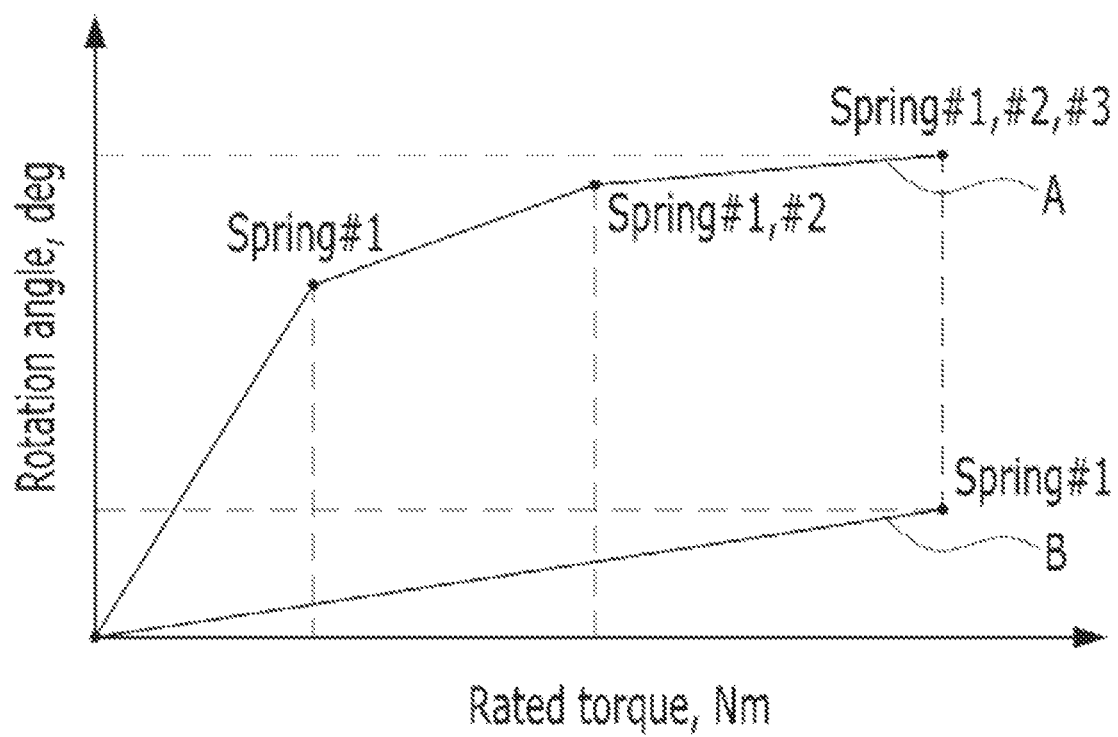
FIG. 7 is a graph illustrating a comparison between rotation angles according to the rated torque of the flexible unit of the actuator module according to the embodiment of the present invention and the flexible unit of the conventional actuator module.

FIG. 7 is a graph illustrating a comparison between rotation angles according to the rated torque of the flexible unit 40 of the actuator module 1 according to the embodiment of the present invention and the flexible unit of the conventional actuator module. That is, FIG. 7 is a graph illustrating a comparison between the torque resolutions of the flexible units. In this case, the conventional flexible unit has a single elastic member. In FIG. 7, "A" refers to the flexible unit 40 of the present invention, and "B" refers to the conventional flexible unit.

Because the conventional flexible unit has a single elastic member and its maximum rotation angle is small, torque must be converted by measuring the displacement of the conventional flexible unit in a very narrow section. Hence, the resolution of the torque is reduced. In order to resolve this problem, it is necessary to use a high-resolution encoder or an elastic member with a large maximum rotation angle. However, the high-resolution encoder brings about an increase in the price of the actuator module, and the elastic member with a large maximum rotation angle brings about an increase in the weight and volume of the actuator module.

In contrast, because the flexible unit 40 of the present invention has a plurality of elastic members 410, 420, and 430 in a stacked form and their maximum rotation angles are large even in a small volume, torque can be converted by measuring the displacement of the flexible unit 40 in a relatively wide section. Therefore, it is possible to realize a high torque resolution in low torque and mean torque regions which are generally used torque regions. That is, the present invention can obtain a high-resolution effect even by a low-resolution encoder.

The above-mentioned embodiments of the present invention are merely examples, and it will be understood by those skilled in the art that various modifications may be made without departing from the spirit and scope or essential features of the invention. Therefore, it should be understood that the embodiments described above are for purposes of illustration only in all aspects and are not intended to limit the scope of the present invention. For example, each component described in a single form may be implemented in a distributed form, and similarly, components described in the distributed form may be implemented in a combined form.

The scope of the present invention is defined by the appended claims, and it should be construed that all modifications or variations derived from the meaning, scope, and equivalent concept of the claims fall within the scope of the invention.

EMBODIMENTS

The embodiments of the present invention have been described together in the best mode for carrying out the disclosure.

INDUSTRIAL APPLICABILITY

The present invention relates to an actuator module with a flexible unit, and is reproducible and industrially applicable since the actuator module is applicable to a variety of robots.

What is claimed is:

1. An actuator module comprising:
a motor for generating a rotational force;
a deceleration gear assembly connected to the motor to receive the rotational force therefrom for reducing a rotational speed;
a plurality of elastic members connected to the deceleration gear assembly to receive the rotational force therefrom, the plurality of elastic members being deformable by an external force; and
an output assembly connected to the plurality of elastic members to receive the rotational force therefrom for outputting the transmitted rotational force to an outside and has a first protrusion extending to the deceleration gear assembly through the plurality of elastic members,
wherein the plurality of elastic members includes a first elastic member disposed adjacent to the output assembly, a second elastic member disposed on the first elastic member, and a third elastic member disposed on the second elastic member and adjacent to the deceleration gear assembly,
wherein each of the first, the second, and the third elastic members has a first insertion groove, into which the first protrusion of the output assembly is to be inserted, and
wherein the first insertion groove of the first elastic member is smaller than that of the second elastic member, and the first insertion groove of the second elastic member is smaller than that of the third elastic member.

2. The actuator module according to claim 1, wherein the first elastic member, the second elastic member, and the third elastic member have a same elastic force or different elastic forces and are configured to be selectively varied depending on a magnitude of the external force applied to the output assembly.

3. The actuator module according to claim 1, wherein each of the first, the second, and the third elastic members has a second insertion groove, and the second insertion grooves of the first, the second, and the third elastic member are of a same size, and
    wherein the deceleration gear assembly has a second protrusion extending to the output assembly through the second insertion grooves.

4. The actuator module according to claim 3, wherein each of the first, the second, and the third elastic members comprises:
    a first body having a hollow defined at its center, and having the first insertion groove formed at a position away from the hollow by a predetermined distance;
    a second body having the second insertion groove formed along a circumference thereof; and
    a plurality of connectors connecting an outer peripheral surface of the first body and an inner peripheral surface of the second body, each of the plurality of connectors being bent in a zigzag form and being deformable by the external force.

5. The actuator module according to claim 1, further comprising a plurality of encoders disposed between the deceleration gear assembly and the plurality of elastic members and between the plurality of elastic members and the output assembly for measuring a displacement of the plurality of elastic members.

6. The actuator module according to claim 1, wherein the motor, the deceleration gear assembly, the plurality of elastic members, and the output assembly are coupled to each other through a shaft.

\* \* \* \* \*